Jan. 7, 1958     E. R. PRICE     2,818,710
POWER ASSISTED ACTUATOR Filed Feb. 19, 1954                 3 Sheets-Sheet 1

INVENTOR.
EARL R. PRICE
BY
G. A. Gust
ATTORNEY

Jan. 7, 1958     E. R. PRICE     2,818,710
POWER ASSISTED ACTUATOR Filed Feb. 19, 1954     3 Sheets-Sheet 2

Fig. 2

INVENTOR.
EARL R. PRICE
BY
*G. A. Gust*
ATTORNEY

# United States Patent Office 2,818,710
Patented Jan. 7, 1958

2,818,710

POWER ASSISTED ACTUATOR

Earl R. Price, South Bend, Ind., assignor to Bendix Aviation Corporation, South Bend, Ind., a corporation of Delaware Application February 19, 1954, Serial No. 411,386

31 Claims. (Cl. 60—54.6)

This application constitutes a continuation-in-part of my copending application Serial No. 251,734, filed October 17, 1951, now abandoned.

The present invention relates to a power-assisted master cylinder and more particularly to a hydraulic pressure producing device which is conjointly operated by manually actuated means and power actuated means.

In certain conventional hydraulic braking systems used on present day vehicles, the braking force delivered to the wheels is developed manually by the use of the brake pressure. In braking applications, the degree of braking effort is usually directly proportional to the amount of force exerted upon the pedal by the operator so that a light pedal pressure will produce a relatively light deceleration while a heavier pedal pressure will produce a correspondingly greater deceleration. With this arrangement, it is obvious that braking deceleration is "felt" by the operator in the form of the degree of effort the operator must exert in obtaining the deceleration. This "feel" or "reaction," as it may be called, constitutes a gauge by which a desired degree of brake actuation may be obtained, and therefore, of course, is invaluable in the proper operation of the vehicle.

In the above, so-called conventional systems, a brake pedal is operated to produce a brake application, and in operating this pedal it is well known that the operator must usually lift his foot off the accelerator and the toeboard in order to reach the pedal. Since there are certain known disadvantages in requiring this type of operator movement, such as operator fatigue and the lapse of time resulting from moving from the accelerator to pedal, it is deemed desirable to use a brake device which may be operated by means of a treadle (substantially the same as the accelerator treadle) whereby the operator need only swing his foot, using his heel as a pivot, from the accelerator to the brake treadle in order to apply the brakes. In changing from a pedal to a treadle, the degree of available treadle movement in applying the brakes is deliberately made considerably less than that for a pedal whereby it becomes necessary to push harder on the treadle than on the pedal to obtain a given value of braking force. This being so, power assistance is availed of to compensate for these differences in function so that the operator will experience substantially the same "feel" in the use of the treadle that he would in the use of a pedal.

One principal problem which has been encountered in the use of power assisted brake devices is the maintenance of the "feel" or "reaction" which corresponds favorably with that "feel" derived from the use of the above-mentioned conventional braking systems. While various expedients for providing "feel" have been proposed, and some adopted, a power-assisted brake device having a built-in reaction feature has not been designed for use on conventional automobiles, or passenger car vehicles, which would meet the requirements of industry in reliability, efficiency, economy, "feel," etc.

It is, therefore, a principal object of this invention to provide a power-assisted master cylinder for use in a vehicle braking system, which will produce the desired braking torque while at the same time convey to the operator a true and pleasant indication of the degree of such braking torque. In such an arrangement, whatever resistance is offered to the pressurizing of the hydraulic fluid, or other force transmitting medium, by the brakes will be proportionately conveyed to the operator so that he "feels" the degree to which his brakes have been applied.

In the accomplishment of this object, improvements over the inventor's previous contributions, as set forth in copending applications Serial No. 167,681, now Patent No. 2,685,170, filed June 12, 1950, and Serial No. 196,854, filed November 21, 1950, now Patent No. 2,685,171, and application Serial No. 419,361, are herein presented wherein "feel" is produced from the very first part of the treadle stroke instead of starting at a predetermined value of braking torque. In the devices of the foregoing applications, no "feel" was experienced until a predetermined degree of braking action was obtained, such as the taking up of the shoe-to-drum clearance, thus sometimes producing the unpleasant and uncontrollable initial "feel" of the pedal dropping a short distance without causing any brake actuation. In the present instance, this deficiency is overcome by providing a natural or conventional "feel" from the very beginning of the treadle stroke thereby apprising the operator of the exact degree to which his brakes have been applied.

In addition to the fact that the "feel" produced by this invention is more natural, certain functional improvements are realized, such as finer control of the braking action wherein it is possible to make light brake applications which are completely controllable. In using the device of the previous applications, "feel" did not result until a predetermined rate of deceleration or braking pressure was realized thereby making it difficult to control the early stages of braking. While the previous devices could be arranged to react from the earliest stages, this arrangement is not regarded as satisfactory since the resultant early reaction or "feel" is excessive for light braking purposes.

A further object of this invention is to provide a novel control valve for a differential air pressure braking unit which determines the extent to which the unit is operated, and which transmits a signal to the operator indicating the degree of actuation of the unit.

Another object is to incorporate in a power-assisted master cylinder for use in a vehicle braking system, a two-stage diaphragm reaction device for apprising the operator of the degree of brake torque resulting from brake application.

An additional object is to incorporate in a power-assisted master cylinder for use in a vehicle braking system, a two-stage diaphragm reaction device including a primary diaphragm portion for transmitting reaction during the initial application of brakes, and a secondary diaphragm portion for transmitting reaction after the initial brake application has been made.

A further object is to utilize in a power-assisted master cylinder for use in a vehicle braking system, a two-stage diaphragm reaction device including primary and secondary reaction portions wherein the secondary reaction portion is inoperative to transmit reaction during a predetermined portion of initial brake application by counter-reaction means.

A still further object is to incorporate in a power-assisted master cylinder for use in a vehicle braking system, a two-stage hydraulic reaction device for apprising the operator of the degree of brake torque resulting from brake applications.

Still another object is to incorporate in a power-assisted master cylinder for use in a vehicle braking system, a two-stage hydraulic reaction device including a primary reaction transmitting member subject to pressure developed in the master cylinder for transmitting reaction during the initial application of brakes, and a secondary reaction transmitting member subject to pressure developed in the master cylinder for transmitting reaction after the initial brake application has been made.

Another object of invention is to utilize in a power-assisted master cylinder for use in a vehicle braking system, a two-stage hydraulic reaction device including primary and secondary reaction transmitting members subject to pressure developed in the master cylinder wherein the secondary reaction transmitting member is inoperative to transmit reaction during a predetermined portion of initial brake application by counter-reaction means.

Other objects and advantages of this invention will become apparent from a consideration of the following description, taken in connection with the accompanying drawings, wherein two embodiments are disclosed by way of example.

Figure 1:
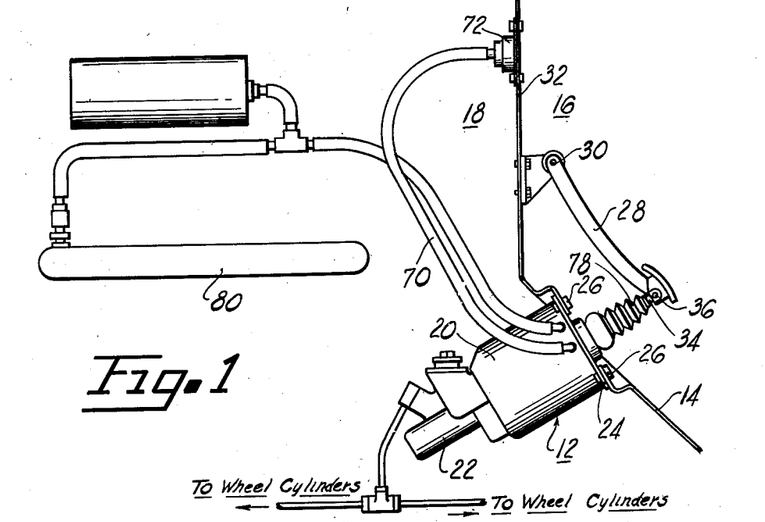
Figure 1 is a diagrammatic illustration showing one embodiment of power-assisted master cylinder as it is used in a vehicle braking system.

Referring to the drawings and more particularly to Figure 1, a power-assisted master cylinder unit 12 is secured directly to the engine compartment side of the toe-board 14, the toe-board being the slanting lower portion of the wall which separates the driver's compartment 16 from the engine compartment 18. The power-assisted master cylinder unit comprises a power cylinder 20 and a hydraulic cylinder 22 mounted on the front end of the power cylinder. The power cylinder casing has an integral mounting flange 24 which is secured, by means of fastening members 26, to the toe-board or any other convenient part of the vehicle.

The power-assisted master cylinder unit 12 is controlled by a treadle 28, which is pivoted at 30 on the driver's compartment side of the fire wall 32. The treadle may be pivoted at its lower end, similarly to a conventional accelerator treadle, if preferred. A control rod 34 is pivotally connected at 36 to the treadle 28, and extends into the power-assisted master cylinder unit to control its operation.

Figure 2:
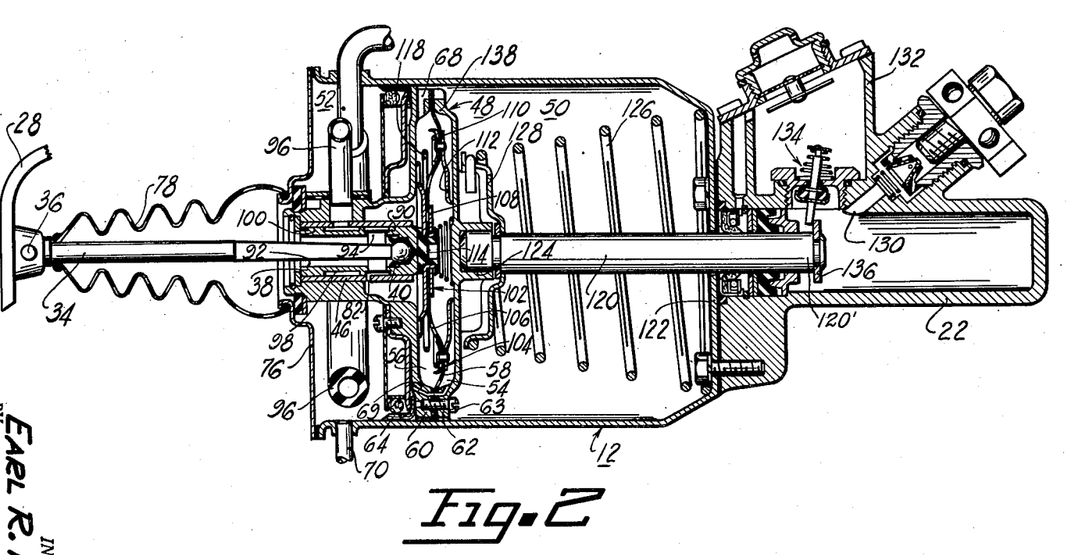
Figure 2 is a sectional view of the power-assisted master cylinder of Figure 1.
Figure 3:
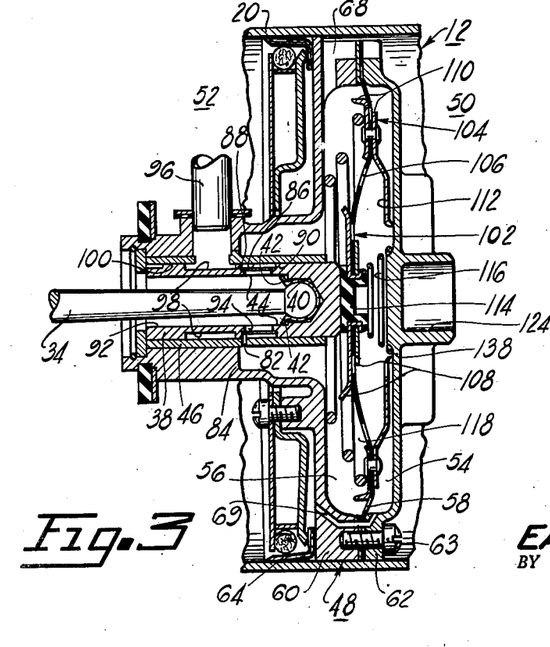
Figure 3 is an enlargement of a part of the master cylinder of Figure 2.

As shown in Figures 2 and 3, the right-hand end of rod 34 operatively engages a valve control member or plunger 38. The rod is connected to the plunger 38 by means of a C-shaped grip retainer 40 which clamps over the rounded right end of rod 34 and which is provided with outwardly inclined ends 42 frictionally engageable with the wall of plunger socket 44 for preventing withdrawal of said rod from said socket. Plunger valve 38 may be characterized as a slide valve which cooperates with a sleeve 46 to control operation of the present invention.

Reciprocably received in cylinder 20 is a pressure responsive movable wall or piston 48 which defines therein two variable volume chambers 50 and 52. This piston 48 is provided with an internal cavity which is divided into two compartments 54 and 56 by means of a pressure responsive diaphragm 58, and is comprised of two plates 60 and 62 which are peripherally joined together by means of a plurality of circumferentially spaced screws 63. This means of fastening the two plates together affords a convenient method of securing diaphragm 58 in position and to seal against fluid communication between the compartments 54 and 56. A packing 64 is secured to the outer periphery of piston 48 to provide an air tight seal on this piston between power chambers 50 and 52. Communication is provided between chamber 50 and compartment 56 by means of a passage 68, while communication between rear chamber 52 and front compartment 54 is provided by a passage 69 through the outer periphery of piston 48.

Although any desired type of differential fluid pressure power device may be used, I prefer to use a differential air pressure power cylinder of the vacuum type, in which the unit is "atmosphere-suspended" when released. Accordingly, chamber 52 and compartment 54 are permanently connected to the atmosphere, preferably through a conduit 70 connected to an air-cleaner 72 (see Figure 1). The rear of the power cylinder could be left open, but cover plate 76 and boot 78 are used to prevent dust and dirt from getting into the interior of the power cylinder.

Valve member 38 selectively controls the communication of compartment 56 (hence also chamber 50) with either the atmosphere in chamber 52 or the vacuum source, such as the usual intake manifold 80. In the position shown, compartment 56 is connected through port 82 in sleeve 46 (which is rigidly mounted in an extension 84 provided on the rear of piston plate 60) with the annular recess 86 formed between the lands 88 and 90 of valve member 38. Recess 86 is continously in communication with the atmospheric pressure prevailing in the hollow center 92 of valve member 38 by means of ports 94. Vacuum is communicated to valve member 38 by means of a coiled rubber tube, or the like, 96 which opens through sleeve 46 into an annular chamber 98 formed between lands 88 and 100 on said valve 38. When rod 34 is forced to the right far enough to advance land 88 of the valve past the port 82, communication of the vacuum in annular chamber 98 is established to compartment 56.

Referring now to the particular construction of the diaphragm 58, it will be seen that this diaphragm is comprised of two concentric rigid portions 102 and 104 interconnected by means of a flexible portion 106. Portion 102, which may hereafter be referred to as a primary reaction part, is composed of a pair of flat plates 108 which clamp therebetween the central portion of the diaphragm 58. The portion 104, which may hereafter be characterized as a secondary reaction part, consists of two annular rigid plates 110 which likewise clamp therebetween the outer peripheral portion of diaphragm 58. Lying within compartment 54 and projecting radially inwardly from one of the annular plates 110 is a rigid section 112 which follows the movement of diaphragm portion 104.

A cushioning button 114 is carried by the central part of diaphragm portion 102 and is held in engagement with the right end of valve 38 by means of a coiled spring 116. A frusto-conically shaped ring spring 118 is interposed between the outer portion 104 of diaphragm 58 and the rear wall of piston 48 so as to bias said outer portion oppositely to that of portion 102. This spring 118 provides a "counter-reaction force," which prevents the diaphragm portion 104 from exerting a reaction force against the operator during the initial force of the brake applying stroke. Diaphragm portion 102 having an initial engagement with the valve member 38 will exert a definite reaction force against the operator during the initial portion of the brake-applying action, which is proportional to the differential pressure prevailing over diaphragm 58. Once this differential pressure has attained a value which develops a force on diaphragm portion 104 sufficient to overcome the load of spring 118, portion 104 will move toward the left until the radial section 112 abuts against portion 102. When this occurs, the total reaction felt by the operator will be the sum of the forces produced by the two diaphragm portions 102 and 104. For convenient reference, as mentioned hereinbefore, since the portion 102 acts initially, this portion may be characterized as a primary reaction member and since the portion 104 acts subsequently it may be considered a secondary reaction member. In restating the above, the primary and secondary reaction parts of diaphragm 58, being relatively movable with respect to each other, will react separately and conjointly upon the operator in a predetermined manner according to the differential pressure prevailing over diaphragm 58. During the low initial differential pressures, only the primary reaction part 102 will react against the operator since the counter-reaction spring 118 prevents the secondary reaction part 104 from leaving its illustrated position. However, once this differential pressure reaches a predetermined value which produces a force on secondary reaction member 104 sufficient to overcome the opposite force of spring 118, it is obvious that this member 104 will move toward the left and integrate with the primary reaction part 102 by means of the rigid pick-up section 112. After such integration, the total force acting against the operator through the valve 38 and push rod 34 will be the aggregate forces exerted by the primary and secondary reaction parts 102 and 104 respectively. Thus it is seen, that a "two stage" reaction is provided which bears a definite relationship to the differential pressure acting on the diaphragm 58. This diaphragm action is termed "two stage" reaction since the initial reactionary force is proportionately smaller than the later reaction force as compared to the differential pressure which acts on the diaphragm.

A force-transmitting member projects through an opening in the front end 122 of cylinder 20 and into the pressure chamber of hydraulic cylinder 22. The left end of this rod 120 fits into a socket 124 centrally provided in piston 48. In order to hold the piston 48 in its illustrated released position, a coiled spring 126 is interposed between the front end 122 of power cylinder 20 and a retainer ring 128 suitably secured to the left end of rod 120. Thus the force of spring 126 is transmitted to piston 48 through the intermediary of the left end of the rod 120.

The hydraulic cylinder 22 is provided with an outlet port 130 through which the fluid pressure created in cylinder 22 may be communicated with the vehicle brakes. A reservoir 132, used to replenish and compensate for loss of fluid from cylinder 22 or thermal variations in the volume of such fluid, has an outlet into cylinder 22 which is controlled by a compensating valve construction 134. This valve 134 has a depending stem projecting into the interior of cylinder 22 where it may be engaged by a flange 136 provided on the right end of rod 120. In the illustrated position, the rod 120 is tilting the valve 134 off its seat so that full communication is provided between reservoir 132 and the pressure chamber of cylinder 22. By moving rod 120 toward the right a distance sufficient to break the engagement between the rod flange 136 and the stem of valve 134, the sealing portion of this valve will completely sever the communication between the reservoir and the cylinder 22.

While it may be obvious from the foregoing description, rod 120 may be characterized as a volumetric plunger which, when moved to the right, will tend to decrease the volume of the pressure chamber of cylinder 22 thereby providing a means for pressurizing any hydraulic fluid in cylinder 22.

When the operator wishes to apply the brakes, he presses on treadle 28, thereby acting through rod 34 on valve member 38. Movement of the valve member toward the right causes air to be evacuated from chamber 50, thereby developing a pressure differential over power piston 48. The force of the power piston acts on pressure-transmitting member 120 in developing pressure in cylinder 22 and in the vehicle brake cylinders. The same pressure differential which acts on piston 48 also acts on diaphragm 58, but in the opposite direction. The force exerted by the diaphragm is, of course, less than that exerted by the power piston, because its effective area is smaller.

As mentioned earlier, reaction contact between the primary reaction member 102 and the valve 38 is not inhibited, and the moment the above-mentioned evacuation begins, a differential pressure will be developed over the diaphragm 58. This differential pressure will act on the primary reaction member 102 with a force which is proportionate to its effective area. Thus, the operator experiences a "feel" from the first moment that he moves treadle 28. In obtaining the most satisfactory "feel," it is preferred that the primary reaction member 102 act during the period of force required for the brake shoes to frictionally engage the drum. It is desirable that during this initial reaction stage, that the reaction force be relatively low so as to correspond to the reaction force experienced by the operator of a conventional, non-power braking system in which the initial pedal travel takes up the usual shoe-to-drum clearance without the expenditure of much force. Thus by using the smaller diameter diaphragm portion 102 to provide the initial reaction feel, it is seen that a natural and true initial braking reaction can be obtained. Of course, after the shoes (in a conventional non-power system) have engaged the drum, more force must be exerted on the pedal to obtain the desired degree of braking deceleration. In conforming the present invention to this increase, at the end of the initial low-treadle-pressure stage, the pressure differential acting on the secondary reaction portion 104 compresses spring 118 sufficiently to bring the connecting section 112 into engagement with the primary diaphragm part 102. This action effectively increases the reaction area of diaphragm 58 so that for further increases in differential pressure over piston 48, hence over diaphragm 58, the reaction felt by the operator on treadle 28 will be proportionately greater, this proportionate increase being the second stage of the "two-stage" reaction explained earlier. Further increases of pressure differential in the power cylinder are accompanied by increases in the reaction force which acts against the operator, and which must be overcome by the operator in order to intensify the brake-applying pressure. The "two-stage" reaction explained above provides a "feel" almost identical to that encountered in the best-designed manually-operated braking systems in which the initial pedal force required to overcome the brake return springs and the normal friction of the brake parts is very light in relation to the pedal force later required to provided braking deceleration.

The force exerted by the operator in resisting the force of the reaction diaphragm is added to the force of the power piston, and they conjoin in driving rod 120 into the hydraulic pressure chamber of cylinder 22. This is true, since the reaction force of the diaphragm 58 when counterbalanced by the force exerted by the operator tends to drive the piston 48 toward the right on its pressure stroke thus making it obvious that the total force tending to drive piston 48 on its pressure stroke must be the sum of the differential pressure prevailing thereover and the pressure exerted by the operator in counterbalancing the diaphragm reaction.

The control valve has the usual follow-up action, since valve 38 slides in sleeve 46 which moves with power piston 48. As the power piston moves on its pressure stroke, it tends to overtake, and "lap" the valve control member, unless brake-applying movement of the treadle continues. Whenever the operator removes his force from the treadle the control valve 38 is pushed back relative to piston 48, into the position in which chamber 50 communicates with the atmosphere by reason of the force exerted by spring 116 through the button 114. The piston 48 is returned to release position by means of the spring 126.

If the operator wishes to add physical force, after the full force of the power unit has been developed, or, if there is a power failure, direct force can be exerted through valve 38 and cushioning button 114 against the front power piston plate 138.

In connection with the second embodiment of the power-assisted actuator to be hereinafter described in Figures 4 and 5, the same reference characters applied in Figures 1 through 3 will be used for similar parts with 200 added thereto.

Figure 4:
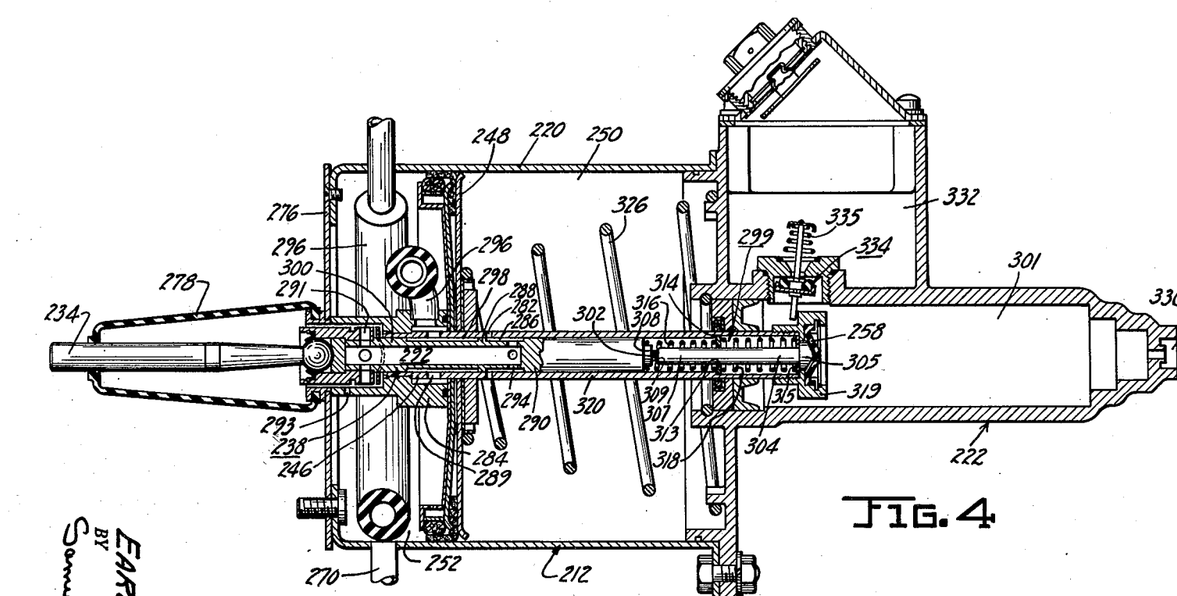
Figure 4 is a longitudinal sectional view taken through the center of a second embodiment of power-actuated master cylinder unit similar to that of Figure 3 with the working parts of the unit being shown in released position.

The power-assisted master cylinder unit 212 of Figure 4 is to be mounted on the floor board of the vehicle and actuated by a treadle 28 in the same manner as unit 12 of Figure 1. The power-assisted master cylinder unit 212 comprises a power cylinder 220 and a hydraulic cylinder 222 mounted on the front end of the power cylinder.

Figure 5:
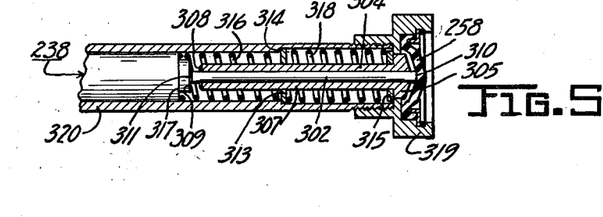
Figure 5 is an enlarged view of a portion of Figure 4 disclosing more clearly the reaction transmitting members.

As shown in Figures 4 and 5, the right-hand end of rod 234 operatively engages a valve control member or plunger 238. Member 238 may be characterized as a slide valve which cooperates with a ported sleeve 246 to control operation of the present invention, as will be subsequently described.

Reciprocably received in cylinder 220 is a pressure responsive movable wall or piston 248 which defines therein two variable volume chambers 250 and 252. A packing similar to that disclosed in Figures 2 and 3 is secured to the outer periphery of piston 248 to provide an airtight seal on this piston between chambers 250 and 252.

The power cylinder of Figures 4 and 5 is preferably disclosed as being the type in which the unit is "atmosphere-suspended" when in released position. Chamber 252 is permanently connected to the atmosphere, preferably through a conduit 270 and may be connected to an air cleaner 72 as shown on Figure 1. The rear of the power cylinder could be left open, however it is shown with a cover plate 276 and boot 278 secured thereto to prevent dust and dirt from getting into the interior of the power cylinder.

Valve member 238 selectively controls the communication of chamber 250 with either the atmosphere in chamber 252, or the vacuum source, such as the usual intake manifold 80, as shown in Figure 1. Chamber 250 is in communication with chamber 252 through port 282, in sleeve 246 (which is rigidly mounted in an extension 284 secured to piston 248 in any suitable manner), annular recess 286, formed between land 288 and portion 290 of valve member 238, ports 294, central bore 292, of valve member 238, ports 291, and passage 293, the latter being located in extension 284.

Vacuum is communicated to annular chamber 298, formed between land 288 and portion 300 on said valve 238, through a coiled rubber tube 296 and a passage 289 formed in the sleeve 246. When rod 234 is forced to the right far enough to advance land 288 of the valve past port 282, communication of the vacuum in annular chamber 298 is established with chamber 250 and a force-differential will exist on power piston 248. Power piston 248 has a member 320 secured thereto, which is an extension of sleeve 246.

The member 320 constitutes a force-transmitting member which extends into the hydraulic cylinder 222 and is equipped with an enlarged liquid-displacing portion 319 located in the hydraulic chamber 301. The force-transmitting member 320 is of tubular construction and houses hydraulic reaction means 299 hereinafter described.

This reaction means 299 includes a secondary reaction member or plunger 304 reciprocably mounted inside the force-transmitting member 320. The reaction plunger 304 has a liquid-displacing head 305 located centrally in portion 319 for engagement with a flexible diaphragm sealing member 258 secured in portion 319 and which is acted upon by pressure developed in hydraulic pressure chamber 301. Plunger 304 includes a stem 307, having a rear surface 308 which is slightly spaced, in released position, from the front surface 309 of the valve control member 238; as shown in Figure 5. Located co-axially in the secondary reaction plunger 304 is a primary reaction plunger 302 which is a rod-like member extending through head 305 and stem 307 of the secondary reaction member. The end of the primary reaction member 302 extending through head 305 is in constant contact with a portion of the flexible diaphragm 258 at 310. The opposite end of the primary reaction member 302 extends beyond rear surface 308 of the secondary reaction member 304 and is in constant contact at 311 with the front surface 309 of control member 238; as seen in Figure 5. A washer 313 engages a shoulder 314 provided inside member 320. Washer 313 is held against the shoulder 314 by a coil spring 318, interposed between the latter and a washer 315 mounted on stem 307. The washer 315 in turn engages head 305 of the reaction plunger. Washer 313 and shoulder 314 provide a fixed internal flange which absorbs all of the reaction force of spring 318 transmitting it to member 320 and thence to power piston 248 until surface 309 of the valve control member 238 is engaged by surface 308 of the secondary reaction plunger 304. Spring 318 thus serves as a "counter-reaction" member which prevents the secondary reaction plunger from exerting an immediate reaction force on the valve control member 238 when pressure is developed in chamber 301. However, the primary reaction plunger 302 which is in constant contact with diaphragm 258 at 310 and control member 238 at 311, will immediately transmit a reaction proportional to the end area of the plunger through valve control member 238 to rod 234 and thence to the operator's foot through pedal 28 as soon as the liquid displacing member 319 is moved due to the pressure-differential existing on power piston 248 and fluid pressure is built up in chamber 301.

A relatively light valve return spring 316 is interposed between a shoulder 317 on the end of member 238 adjacent surface 309 and the face of washer 313 opposite to that face which coil spring 318 abuts. The valve return spring 316 causes valve member 238 to be urged to the left when pressure is released on treadle 28 and thus cut off vacuum communication to chamber 250. A return spring 326 is located in chamber 250 and functions in the same manner as spring 126 of power unit 12.

A valve 334 controls communication between pressure chamber 301 and a reservoir 332 and includes a spring 335 which urges the valve to a closed position. The hydraulic cylinder has an outlet port 330 through which fluid pressure developed in cylinder 222 may communicate with the vehicle brakes.

Operation of the power-actuated master cylinder disclosed in Figures 4 and 5 is as follows: When the operator depresses the treadle, he moves rod 234 and valve control member 238 to the right, against the resistance of the light valve return spring 316. Land 288 is moved to the right, and cuts off communication between atmosphere space 286 and chamber 250 of the power cylinder, and thereafter connects the vacuum source through vacuum space 298 to chamber 250 via ports 282. As air is evacuated from chamber 250, a pressure differential is developed on power piston 248 causing the piston to move toward the right. Thus movement of the power piston 248 also moves the force-transmitting member 320 toward the right displacing fluid from hydraulic pressure chamber 301 to the wheel cylinders, not shown, of the brake system in a manner well known to those skilled in the art.

Movement of force-transmitting member 320 as aforementioned not only causes fluid to be displaced from the pressure chamber 301 but also causes pressure to be built up therein. The pressure built up reacts on diaphragm 258 causing an immediate pressure reaction transmittal to the member 238 by primary reaction member 302, counter-reaction spring 318 preventing the secondary reaction member 304 from immediately transmitting fluid pressure reaction to member 238 and thence to the operator. When the force of the fluid pressure in chamber 301 is sufficient to overcome the counter-reaction spring 318, the secondary reaction member 304 will move so that face 308 will contact face 309 of the valve control member 238 and fluid pressure reaction will be transmitted to the operator through secondary reaction member 304.

The control valve has the usual follow-up action, since control valve member 238 slides in sleeve 246 which moves with the power piston 248. As the power piston moves on its pressure stroke, it tends to overtake, or "lap," the valve control member unless brake applying movement of the treadle 28 continues.

Whenever the operator removes his foot pressure on the treadle the control valve member is pushed back by valve return spring 316, chamber 250 will again communicate with the atmosphere through annular recess 286, and spring 326 will cause the power piston 238 and the fluid-displacing portion of the force transmitting member 320 which extends into pressure chamber 301 to return to a retracted position. It is to be observed that the primary reaction member or rod 302 still remains in contact with diaphragm 258 and surface 309 to be available to immediately transmit any reaction due to pressure build up in chamber 301.

The operator may in this embodiment, as well as that in Figures 2 and 3, apply direct force through valve 238 to apply the brakes in event of power failure or to add physical force after full force of the power unit has been developed.

In the foregoing specification and the appended claims, the identifying terms used are intended to convey meanings which include the range of equivalent elements. For example, the term "power cylinder" is intended to include any chamber or cylinder having a pressure responsive member movable therein; this pressure responsive member could readily be a piston, diaphragm or any other such member having a comparable function. The terms "front" and "rear" or any other directional terms are intended to have only a relative connotation to aid in describing the device and are not intended to be interpreted as requiring any particular orientation with any external elements.

Although particular embodiments of the invention have been illustrated and described other changes and modifications will be apparent to those skilled in the art. All changes and modifications falling within the scope of the claims are intended to be claimed.

I claim:

1. For use in a fluid pressure system, a pressure producing device comprising a power cylinder, a pressure responsive movable wall in the power cylinder, pressure responsive reaction means carried by said wall and arranged to exert a reaction force proportional to that exerted by said wall, a valve control member associated with said movable wall and operable to control the differential pressure prevailing over said wall, said reaction means being composed of primary and secondary reaction means, said primary reaction means being arranged to react on said control valve member for all values of the aforementioned differential pressure, and said secondary reaction means being arranged to react on said control valve member only after said differential pressure has attained a predetermined value, and manually operable means arranged to act on said valve control member and to add the actuating force applied thereto to the actuating force of said movable wall.

2. For use in a fluid pressure system, a pressure producing device comprising a power cylinder, a pressure responsive movable wall in the power cylinder, pressure responsive reaction means carried by said wall and arranged to exert a reaction force proportional to that exerted by said wall, and manually operable means cooperatively associated with said movable wall to control the differential pressure acting on said movable wall, said reaction means being comprised of cooperatively associated relatively movable first and second pressure responsive members, the first pressure responsive member being so arranged as to react upon said manually operable means for any value of the aforementioned pressure, and said second pressure responsive member being so arranged as to react conjointly with said first pressure responsive member when said differential pressure attains a predetermined value.

3. For use in a fluid pressure system, a pressure producing device comprising a powder cylinder, a pressure responsive movable wall in the power cylinder, pressure responsive reaction means carried by said wall and arranged to exert a reaction force proportional to that exerted by said wall, and manually operable means cooperatively associated with said movable wall to control the differential pressure acting on said movable wall, said reaction means comprising primary and secondary reaction means which may operate independently of each other, the primary reaction means being so arranged as to provide the only reactionary force on said manually operable means for a predetermined range of low values of the aforementioned pressure, and said secondary reaction means being so arranged as to provide reactionary force for all values of said differential pressure above a predetermined value.

4. For use in a differential pressure power unit, a reactionary control valve device comprising an enclosure, a diaphragm which divides said enclosure into two variable volume chambers, a control valve reciprocably carried by said enclosure and having high and low pressure ports, said control valve being adapted to control a differential pressure prevailing over said diaphragm, operator operated means associated with said control valve for actuating same, a plate centrally secured to said diaphragm, a spring interposed between said wall and said plate urging the latter toward said control valve, an annulus disposed in radially spaced relation to said plate and secured to said diaphragm, said annulus having a radially inwardly extending projection which is laterally spaced from but engageable with said plate, and a counter-reaction spring biasing said annulus in a direction to maintain the aforementioned laterally spaced relation, the effective plate portion of the diaphragm reacting against said control valve for all values of the aforementioned differential pressure, and the remaining effective portion of said diaphragm reacting to assist said plate portion for all values of said differential pressure above a predetermined value by means of the engagement of said projection and said plate portion, the reactionary force of said diaphragm being communicated through said control valve to said operator operated means.

5. For use in a differential pressure power unit, a reactionary control valve device comprising an enclosure, a diaphragm which divides said enclosure into two variable volume chambers, a control valve reciprocably carried by said enclosure and having high and low pressure ports, said control valve being adapted to control a differential pressure prevailing over said diaphragm, operator operated means associated with said control valve for actuating same, said diaphragm being comprised of primary and secondary reaction parts, said control valve being engageable with the primary part so that for all values of the aforementioned differential pressure up to a predetermined value said primary part will react against said control valve, said secondary reaction part being disabled during said values of pressure but becoming active after said predetermined value is reached to react on said control valve conjointly with said primary part, the reactionary force of said diaphragm being transmitted to said operator operated means in opposition to actuating movement of the latter mentioned means.

6. For use in a differential pressure power unit, a reactionary control valve device comprising a pressure responsive reaction means, value means cooperatively associated with said pressure responsive reaction means to control the differential pressure which acts on the latter-mentioned means, and operator operated means associated with said valve means for actuating same, said valve means being operatively engageable with said reaction means, said reaction means comprising primary and secondary reaction means which are so arranged that for a predetermined range of values of the aforementioned pressure only the primary reaction means will react on said valve means and for all other values of pressure the secondary reaction means will react on said valve means, the reactionary force produced by said reaction means being transmitted to said operator operated means to oppose actuating movement thereof.

7. For use in a vehicle braking system, a power-assisted actuator comprising a differential air pressure power cylinder, a movable wall reciprocable in said power cylinder and dividing said power cylinder into first and second variable volume chambers, said wall having an internal compartment, a pressure-responsive diaphragm dividing said compartment into third and fourth chambers, a first passage arranged to connect said first and third chambers, a second passage arranged to connect said second and fourth chambers, a follow-up valve control member reciprocably mounted in a portion of said wall, said valve member having high and low pressure ports which control the operation of said movable wall by virtue of movement of said valve member with respect to said wall, a primary reaction member carried by said diaphragm, a secondary reaction member also carried by said diaphragm and disposed radially outwardly of said primary reaction member in a manner such as to provide a flexible diaphragm portion between said reaction members, a substantially rigid member carried by said secondary reaction member in spaced relation to said primary reaction member but engageable with said primary reaction member when said secondary reaction member is moved toward said valve member whereby both of said reaction members will act as one, a counter-reaction spring interposed between said secondary reaction member and said movable wall in a manner such as to urge said secondary reaction member out of operative engagement with said primary reaction member, and a manually operated member arranged to act on said valve member to control its movements and to transfer the actuating force exerted on said manually actuated member to said movable wall.

8. For use in a vehicle braking system, a power-assisted actuator comprising a differential air pressure-power cylinder, a movable wall reciprocable in said power cylinder and dividing said power cylinder into first and second variable volume chambers, said wall having an internal compartment, a pressure-responsive diaphragm dividing said compartment into third and fourth chambers, a first passage arranged to connect said first and third chambers, a second passage arranged to connect said second and fourth chambers, a follow-up valve control member reciprocably mounted in a portion of said wall, said valve member having high and low pressure ports which control the operation of said movable wall by virtue of movement of said valve member with respect to said wall, a primary reaction member carried by said diaphragm, a secondary reaction member also carried by said diaphragm and disposed radially outwardly of said primary reaction member in a manner such as to provide a flexible diaphragm portion between said reaction members, a substantially rigid member carried by said secondary reaction member in spaced relation to said primary reaction member but engageable with said primary reaction member when said secondary reaction member is moved toward said valve member whereby both of said reaction members will act as one, resilient counter-reaction means interposed between said secondary reaction member and said movable wall in a manner such as to urge said secondary reaction member away from said primary reaction member, and a manually operated member arranged to act on said valve member to control its movements and to transfer the actuating force exerted on said manually actuated member to said movable wall.

9. For use in a vehicle braking system, a power-assisted actuator comprising a differential air pressure power cylinder, a movable wall reciprocable in said power cylinder and dividing said power cylinder into first and second variable volume chambers, said wall having an internal compartment, a pressure-responsive diaphragm dividing said compartment into third and fourth chambers, a first passage arranged to connect said first and third chambers, a second passage arranged to connect said second and fourth chambers, a valve control member reciprocably mounted in a portion of said wall, a primary reaction member carried by said diaphragm, a secondary reaction member also carried by said diaphragm and disposed radially outwardly of said primary reaction member in a manner such as to provide a flexible diaphragm portion between said reaction members, a substantially rigid member carried by said secondary reaction member in spaced relation to said primary reaction member but engageable with said primary reaction member when said secondary reaction member is moved toward said valve member whereby both of said reaction members will act as one, a counter-reaction spring interposed between said secondary reaction member and said movable wall in a manner such as to urge said secondary reaction member away from said primary reaction member, and a manually operated member arranged to act on said valve member to control its movements and to transfer the actuating force exerted on said manually actuated member to said movable wall.

10. For use in a vehicle braking system, a power assisted actuator comprising a differential air pressure power cylinder, a movable wall reciprocable in said power cylinder and dividing said power cylinder into first and second variable volume chambers, said wall having an internal compartment, a pressure-responsive diaphragm dividing said compartment into third and fourth chambers, a first passage arranged to connect said first and third chambers, a second passage arranged to connect said second and fourth chambers, a manually operable valve member reciprocable in a portion of said wall and being engageable by said diaphragm, said diaphragm comprising two relatively movable radially inner and outer substantially rigid portions, the outer of said portions having a radially inwardly extending substantially rigid member spaced from but engageable with said inner portion on the side opposite from said valve member, said portions being integrated for movement in a direction toward said valve member when said radially inwardly extending member engages said inner portion, a counter-reaction spring acting on said outer portion in a manner such as to oppose integration of said portions, and a manually operated member arranged to act on said valve member to control its movements and to transfer the actuating force exerted on said manually actuated member to said movable wall.

11. For use in a vehicle braking system, a power-assisted actuator comprising a differential air pressure power cylinder, a movable wall reciprocable in said power cylinder and dividing said power cylinder into first and second variable volume chambers, said wall having an internal compartment, a pressure-responsive diaphragm dividing said compartment into third and fourth chambers, a first passage arranged to connect said first and third chambers, a second passage arranged to connect said second and fourth chambers, an actuating member reciprocable in a portion of said movable wall and being engageable by said diaphragm, said diaphragm comprising two relatively movable radially inner and outer substantially rigid portions, the inner one of which is interposed between said actuating member and a part of said wall, the outer of said portions having a radially inwardly extending substantially rigid member spaced from but engageable with said inner portion on the side opposite from said actuating member, said portions being integrated for movement in a direction toward said actuating member when said radially inwardly extending member engages said inner portion, and a counter-reaction spring acting on said outer concentric portion in a manner such as to oppose integration of said concentric portions.

12. For use in a vehicle braking system, a power-assisted actuator comprising a differential air pressure power cylinder, a movable wall reciprocable in said power cylinder and dividing said power cylinder into first and second variable volume chambers, said wall having an internal compartment, a pressure-responsive diaphragm dividing said compartment into third and fourth chambers, a first passage arranged to connect said first and third chambers, a second passage arranged to connect said second and fourth chambers, and an actuating member reciprocable in a portion of said wall and being engageable by said diaphragm, said diaphragm being comprised of relatively movable primary and secondary reaction members which may be integrated for movement in unison, the primary reaction member being engageable with said actuating member whereby a reaction force may be imposed upon said actuating member in opposition to normal actuating movement of said actuating member, the secondary reaction member being yieldably urged out of integration with said primary reaction member but movable into integration with said primary reaction member when the differential pressure over said secondary reaction member attains a predetermined value.

13. For use in a fluid pressure system, a power-assisted actuator comprising a differential pressure power cylinder, a pressure responsive wall movable in said power cylinder and dividing said power cylinder into front and rear chambers, said movable wall being so constructed as to provide an internal reaction member, a diaphragm which divides said reaction chamber into front and rear compartments, said front compartment communicating with said rear chamber and said rear compartment communicating with said front chamber, a valve control member reciprocably mounted in said movable wall and arranged to control the operation of said movable wall, said diaphragm comprising relatively movable primary and secondary reaction members which may be operatively united to act as a single reaction unit, said primary reaction member being yieldably urged into engagement with said valve control member, said secondary reaction member being yieldably urged in a direction to oppose operative uniting of the two reaction members, and an actuating member which acts on said valve control member to control its movements and to add the actuating force exerted on said actuating member to the force exerted by the movable wall.

14. For use in a fluid pressure system, a power-assisted actuator comprising a differential pressure power cylinder, a pressure responsive wall movable in said power cylinder and dividing said power cylinder into front and rear chambers, said movable wall being so constructed as to provide an internal reaction chamber, a diaphragm which divides said reaction chamber into front and rear compartments, said front compartment communicating with said rear chamber and said rear compartment communicating with said front chamber, a reciprocable valve control member arranged to control the operation of said movable wall, said diaphragm comprising relatively movable primary and secondary reaction members which may be operatively united to act as a single reaction unit, said primary reaction member being arranged to engage said valve control member, said secondary reaction member being yieldably urged in a direction to oppose operative uniting of the two reaction members, and an actuating member which acts on said valve control member to control its movements and to add the actuating force exerted on said actuating member to the force exerted by the movable wall.

15. For use in a fluid pressure system, a power-assisted actuator comprising a differential pressure power cylinder, a pressure responsive wall movable in said power cylinder and dividing said power cylinder into front and rear chambers, said movable wall being so constructed as to provide an internal reaction chamber, a pressure responsive reaction partition which divides said reaction chamber into front and rear compartments, said front compartment communicating with said rear chamber and said rear compartment communicating with said front chamber, a valve control member reciprocably mounted in said movable wall and arranged to control the operation of said movable wall, said partition comprising relatively movable primary and secondary reaction members which may be operatively united to act as a single reaction unit, said primary reaction member being arranged to engage said valve control member, said secondary reaction member being yieldably urged in a direction to oppose operative uniting of the two reaction members, and an actuating member which acts on said valve control member to control its movements and to add the actuating force exerted on said actuating member to the force of the movable wall.

16. For use in a fluid pressure system, a pressure producing device comprising a differential pressure power cylinder, a pressure responsive movable wall in the power cylinder, pressure responsive reaction means carried by the movable wall and arranged to exert a force proportional to that exerted by said movable wall but in the opposite direction, a valve control member reciprocably associated with said movable wall, said reaction means comprising relatively movable primary and secondary reaction means which may be operatively conjoined to act as a single reaction unit, said primary reaction means being adapted to engage said valve control member and to react thereon whenever a differential pressure is created over said pressure responsive reaction means, said secondary reaction means conjoining with said primary reaction means when the aforementioned differential pressure attains a predetermined value to exert a reaction force on said valve control member in addition to the reaction force of said primary reaction means, and a manually operated member which acts on said valve control member to control its movements and to add the actuating force exerted on said manually operated member to the force exerted by the movable wall.

17. For use in a fluid pressure system, a pressure producing device comprising a power cylinder, a pressure responsive movable wall in said cylinder; and pressure responsive reaction means for exerting a reaction force as a function of the force exerted by said wall including means defining a reaction chamber, a diaphragm dividing said chamber into a pair of variable volume chambers, a plate carried by the central portion of said diaphragm, an annulus also carried by said diaphragm in radially spaced relation to said plate, said annulus having a radially inwardly extending projection which is normally laterally spaced from but engageable with said plate, and a counter-reaction spring biasing said annulus in a direction to maintain such laterally spaced relation, the effective plate portion of the diaphragm reacting for all values of reactance differential pressures across the diaphragm and the remaining effective portion of said diaphragm reacting in unison with said plate portion when the force of the counter-reaction spring has been overcome to a point where said projection engages said plate portion.

18. For use in a fluid pressure system, a pressure producing device comprising a power cylinder, a pressure responsive movable wall in said cylinder, operator-operated means for controlling the differential pressure acting on said wall; and pressure responsive reaction means for exerting a reaction force as a function of the force exerted by said wall including means defining a reaction chamber, a diaphragm dividing said chamber into a pair of variable volume chambers, resilient means biasing a portion of said diaphragm in a direction such that said portion remains ineffective to react against said operator-operated means for predetermined low values of differential pressures, and means rendering both portions of said diaphragm effective to react against said operator-operated means for higher values of differential pressures.

19. For use in a fluid pressure system, a pressure producing device comprising a power cylinder, a pressure responsive movable wall in the power cylinder, a pressure responsive reaction means arranged to exert a reaction force as a function of the force exerted by said movable wall, and manually operable means cooperatively associated with said movable wall to control the differential pressure acting on said wall, said reaction means comprising cooperatively associated relatively movable primary and secondary reaction members so arranged that for a predetermined range of differential pressures acting on said wall only the primary reaction member will react on said manually operable means and for any value of the differential pressure beyond said range, the secondary reaction member will react on said manually operable means.

20. For use in a fluid pressure system, a pressure producing device comprising a power cylinder, a pressure responsive movable wall in the power cylinder, pressure responsive reaction means for producing a reaction force as a function of the force exerted by said wall, valve means for controlling the differential pressure acting on said movable wall, and manually operable means cooperatively associated with said valve means and said reaction means, said reaction means comprising primary and secondary reaction members so arranged that for a predetermined range of values of the differential pressure acting on said wall only the primary reaction member will react on said manual means and for all other values of pressure both the primary and secondary reaction members will react on said manual means.

21. A pressure producing device comprising a power cylinder, a pressure responsive movable wall in the power cylinder, pressure responsive reaction means for producing a reaction force which bears a relationship to the force exerted by said wall, valve means for controlling the differential pressure acting on said movable wall, and force-transmitting means for transferring the reaction force from the reaction means to an operator, said reaction means including a first member capable of producing a first reaction force which acts against the operator upon initial actuation of the valve means and a second member capable of producing a second reaction force which acts against the operator after the first reaction force.

22. A hydraulic pressure producing device including a power cylinder and hydraulic cylinder, a pressure-responsive movable wall in the power cylinder, a pressure-transmitting member operatively associated with the movable wall and having a portion to displace fluid in the hydraulic cylinder, a control member controlling the operation of the movable wall, a reaction-plunger having one end operatively associated with the control member and the other end subject to pressure in the hydraulic cylinder, reaction neutralizing means adapted to neutralize a portion of initial reaction exerted on the end of the reaction plunger in the hydraulic cylinder, and means associated with the reaction-plunger and control member for transmitting a proportionate amount of reaction to the control member upon movement of the movable wall and associated pressure-transmitting member to present a constant proportionate reaction on the control member when the pressure-transmitting member is moved in the hydraulic cylinder.

23. A hydraulic pressure producing device as set forth in claim 22 wherein the last mentioned means is in contact with the control member and is arranged to be operated upon by pressure in the hydraulic cylinder.

24. A hydraulic pressure producing device as set forth in claim 22 wherein the pressure-transmitting member includes a flexible diaphragm in the fluid displacing portion in the hydraulic cylinder, the reaction plunger being reciprocably mounted in said pressure-transmitting member having one end adapted to contact the control member and the other end adapted to contact said flexible diaphragm, said reaction neutralizing means consisting of a counter-reaction resilient member operatively associated with said reaction plunger and said last mentioned means consisting of an elongated rod-like member reciprocably mounted co-axially in said reaction plunger and having ends extending beyond said reaction plunger, one end being in contact with said control member and the other end being in contact with said flexible diaphragm.

25. For use in fluid pressure system, a pressure producing device comprising a power cylinder, a pressure responsive movable wall in the power cylinder, pressure responsive reaction means carried by said wall and arranged to exert a reaction force proportional to that exerted by said wall, and manually operable means cooperatively associated with said movable wall to control the differential pressure acting on said movable wall, said reaction means comprising primary and secondary reaction means which may operate independently of each other, the primary reaction means being so arranged as to provide the only reactionary force on said manually operable means for a predetermined range of low values of the aforementioned pressure, and said secondary reaction means being so arranged as to provide reactionary force for all values of said differential pressure above a predetermined value, and counter-reaction means biasing the secondary reaction member so that said secondary reaction means will be inoperative to transmit reaction during said aforementioned predetermined range of values wherein only the primary reaction member transmits reaction.

26. A hydraulic pressure producing device including a power cylinder and hydraulic cylinder, a pressure-responsive movable wall in the power cylinder, a pressure-transmitting member operatively associated with the movable wall and having a portion to displace fluid in the hydraulic cylinder, a control member controlling the operation of the movable wall, secondary reaction means operatively associated with said control member and arranged to transmit reaction to said control member proportional to movement of said pressure responsive movable wall, reaction neutralizing means arranged with said secondary reaction means for neutralizing a predetermined portion of initial reaction on said secondary reaction means, and primary reaction means reciprocable with respect to said secondary reaction means and transmitting a proportionate amount of initial reaction to said control member upon movement of said control member when said secondary reaction means is neutralized.

27. For use in a fluid pressure system, a pressure producing means including a force transmitting member, pressure responsive means cooperating with said force transmitting member, operator operated means adapted to control said pressure responsive means, and means adapted to transmit two-stage reaction to said operator operated means substantially in proportion to the force acting through said force transmitting member, including means adapted to delay reaction to said manually actuated means.

28. A hydraulic pressure producing device comprising a power cylinder, a hydraulic cylinder, a pressure responsive movable wall in the power cylinder, a pressure transmitting member acted on by the movable wall and provided with a fluid displacing portion in the hydraulic cylinder, manually operable valve means including a control member for controlling the operation of the movable wall, reaction means for transmitting a reaction force as a function of the pressure developed in said hydraulic cylinder to said manual control member, said means embracing two reaction elements each having an end subject to the pressure developed in said hydraulic cylinder, with the other end of one of said elements being in engagement with said control member and the other end of the other of said elements being held out of engagement with said control member.

29. A hydraulic pressure producing device comprising a power cylinder, a hydraulic cylinder, a pressure responsive movable wall in the power cylinder, a pressure transmitting tubular member acted on by the movable wall and provided with a fluid displacing head in the hydraulic cylinder, manually operable valve means including a control member for controlling the operation of the movable wall, reaction means in said tubular member for transmitting a reaction force as a function of the pressure developed in said hydraulic cylinder to said manual control member, said means embracing two reaction elements each having an end subject to the pressure developed in said hydraulic cylinder, with the other end of one of said elements being in engagement with said control member and the other end of the other of said elements being held out of engagement with said control member, and yieldable means arranged to absorb the initial reaction force acting on said other element.

30. A hydraulic pressure producing device comprising a power cylinder, a hydraulic cylinder, a pressure responsive movable wall in the power cylinder, a pressure transmitting tubular member secured to the movable wall and provided with a fluid displacing end in the hydraulic cylinder, manually operable valve means including a control member for controlling the operation of the movable wall, reaction means in said tubular member for transmitting a reaction force as a function of the pressure developed in said hydraulic cylinder to said manual control member, said means embracing two reaction elements each having an end subject to the pressure developed in said hydraulic cylinder, with the other end of one of said elements being in engagement with said control member and the other end of the other of said elements being normally out of engagement with said control member, and yieldable means arranged in said pressure transmitting tubular member to transfer the initial reaction force on said other element to said tubular member.

31. A hydraulic pressure producing device comprising a power cylinder, a hydraulic cylinder, a pressure responsive movable wall in the power cylinder, a pressure transmitting member acted on by the movable wall and provided with a fluid displacing portion in the hydraulic cylinder, manually operable valve means including a control member for controlling the operation of the movable wall, reaction means for transmitting a reaction force as a function of the pressure developed in said hydraulic cylinder to said manual control member, said means embracing two reaction elements each being capable of transmitting a reaction force to said control member that is dependent upon pressure in said hydraulic cylinder, and yieldable means arranged to absorb the initial reaction force acting on one of said elements.

References Cited in the file of this patent

UNITED STATES PATENTS

| | | |
|---|---|---|
| 2,685,170 | Price | Aug. 3, 1954 |
| 2,685,171 | Price | Aug. 3, 1954 |
| 2,685,172 | Price | Aug. 3, 1954 |
| 2,690,740 | Hupp | Oct. 5, 1954 |